United States Patent [19]

Blair et al.

[11] E Patent Number: Re. 33,662

[45] Reissued Date of Patent: Aug. 13, 1991

[54] TV ANIMATION INTERACTIVELY CONTROLLED BY THE VIEWER

[76] Inventors: Preston E. Blair, 26212 Mesa Dr., Carmel, Calif. 93923; Frank S. Preston, 3003 Larkspur Run, Williamsburg, Va. 23185

[21] Appl. No.: 410,651

[22] Filed: Sep. 21, 1989 (Under 37 CFR 1.47)

Related U.S. Patent Documents

Reissue of:

[64] Patent No.: 4,695,953
Issued: Sep. 22, 1987
Appl. No.: 831,170
Filed: Apr. 14, 1986

U.S. Applications:

[63] Continuation of Ser. No. 526,464, Aug. 25, 1983, abandoned.

[51] Int. Cl.[5] ..... G06F 15/44; G11B 31/00; A63F 9/22

[52] U.S. Cl. ..... 364/410; 273/85 G; 273/316; 273/DIG. 28; 352/87

[58] Field of Search ... 364/200 MS File, 900 MS File, 364/410, 411, 521; 434/307, 308, 309, 323; 273/316, 333, 1 E, 85 G, DIG. 28, 185 A, 185 B; 73/607, 618, 620; 352/50, 87; 340/720

[56] References Cited

U.S. PATENT DOCUMENTS

| | | | |
|---|---|---|---|
| 3,706,850 | 12/1972 | Fisher et al. | 178/18 |
| 4,060,915 | 12/1977 | Conway | 35/9 A |
| 4,101,132 | 7/1978 | Conrey et al. | 273/DIG. 28 X |
| 4,185,825 | 1/1980 | Bromley | 273/DIG. 28 X |
| 4,210,329 | 7/1980 | Steiger et al. | 273/DIG. 28 X |
| 4,285,523 | 8/1981 | Lemelson | 278/DIG. 28 X |
| 4,305,131 | 12/1981 | Best | 364/410 X |
| 4,333,152 | 6/1982 | Best | 364/521 |
| 4,343,469 | 8/1982 | Kunita et al. | 273/185 A |
| 4,359,223 | 11/1982 | Baer et al. | 273/DIG. 28 X |
| 4,360,345 | 11/1982 | Hon | 434/307 X |
| 4,395,045 | 7/1983 | Baer | 273/DIG. 28 X |
| 4,422,105 | 12/1983 | Rodesch et al. | 364/521 X |
| 4,449,198 | 5/1984 | Kroon | 364/900 |
| 4,490,810 | 12/1984 | Hon | 364/900 |
| 4,518,361 | 5/1985 | Conway | 434/307 |
| 4,571,640 | 2/1986 | Baer | 273/1 E X |
| 4,580,782 | 4/1986 | Ochi | 273/85 G X |

FOREIGN PATENT DOCUMENTS 8403792 9/1984 PCT Int'l Appl. ..... 364/410

OTHER PUBLICATIONS

McGuigan, C. et al., "Mini-Movies Make the Scene", *Newsweek*, Aug. 8, 1983, 79.

Solomon, C., "Fantasy, technology meets in Dragon's Lair", *Los Angeles Times*, Aug. 9, 1983, 1,5.

Rifkin, I., "Video industry draws new life from animation", *Daily News*, Aug. 11, 1983.

"Videodisc games to hit the arcades this summer", *Softalk*, Aug. 1983, 268,273.

Wood, D. B., "Interactive Laser Game Ignites Enthusiasm-and Controversy", *Christian Science Monitor*, Feb. 17, 1987.

*Primary Examiner*—Clark A. Jablon

*Attorney, Agent, or Firm*—Schroeder, Davis & Orliss

[57] ABSTRACT

The motion picture branching method is superseded by an animation method which enables rapid and repeated switching of multiple tracks of different camera-originated animation of the same character during continuous action in a scene, and enables branching at the termination of an action to multiple actions or scenes. This method is the basis of a double-circuit video system that enables a player to repeatedly touch or hit an animated character during a continuous action as displayed on a projection screen or television monitor and thus change the action repeatedly. Another system embodiment enables the player to swing a racket before the screen or television monitor, hit the mid-air projected image of a perspective ball animated action, return the ball back to the animated character opponent, and play a simulated game during the the player exercises the same skills used to play the game simulated. An ultrasonic transducer of a playing instrument and a microphone combination on the television face or at angles to the playing action produces a readout of the television product position or the mid-air position of the playing instrument relating to the game. The readout signal is converted into digital form and compared to a similar readout in digital form of the position of the character or object in the frame of the animation displayed by the television and digitally coded in the video tape or disc.

33 Claims, 9 Drawing Sheets

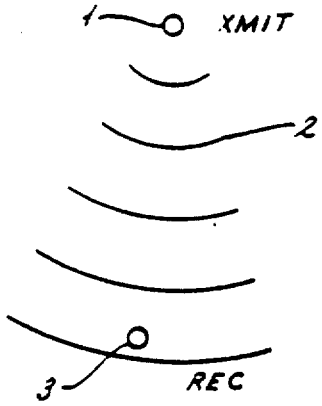
FIG.4
FIG.5
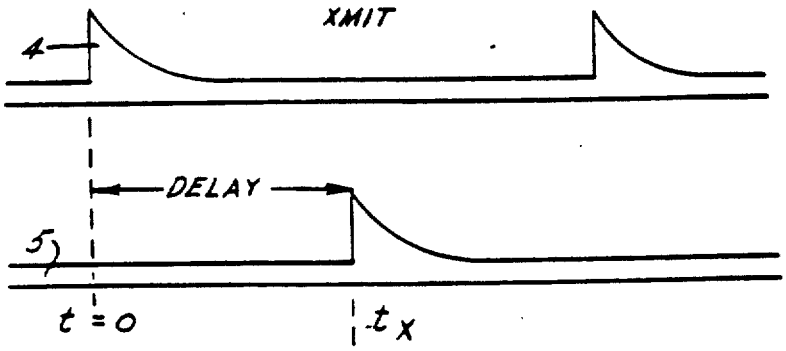
FIG.6
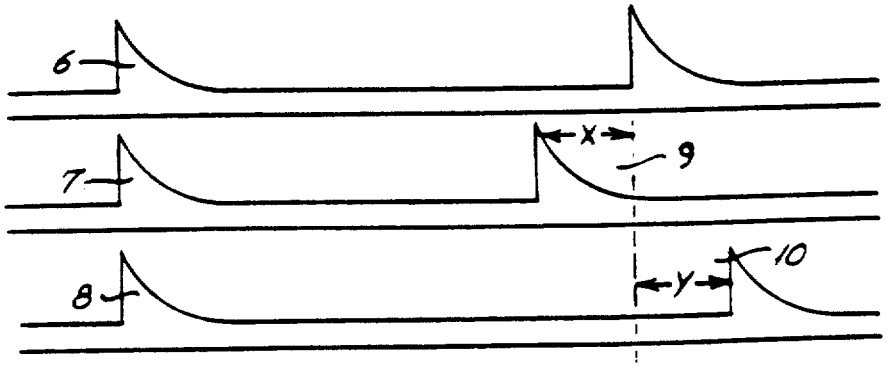

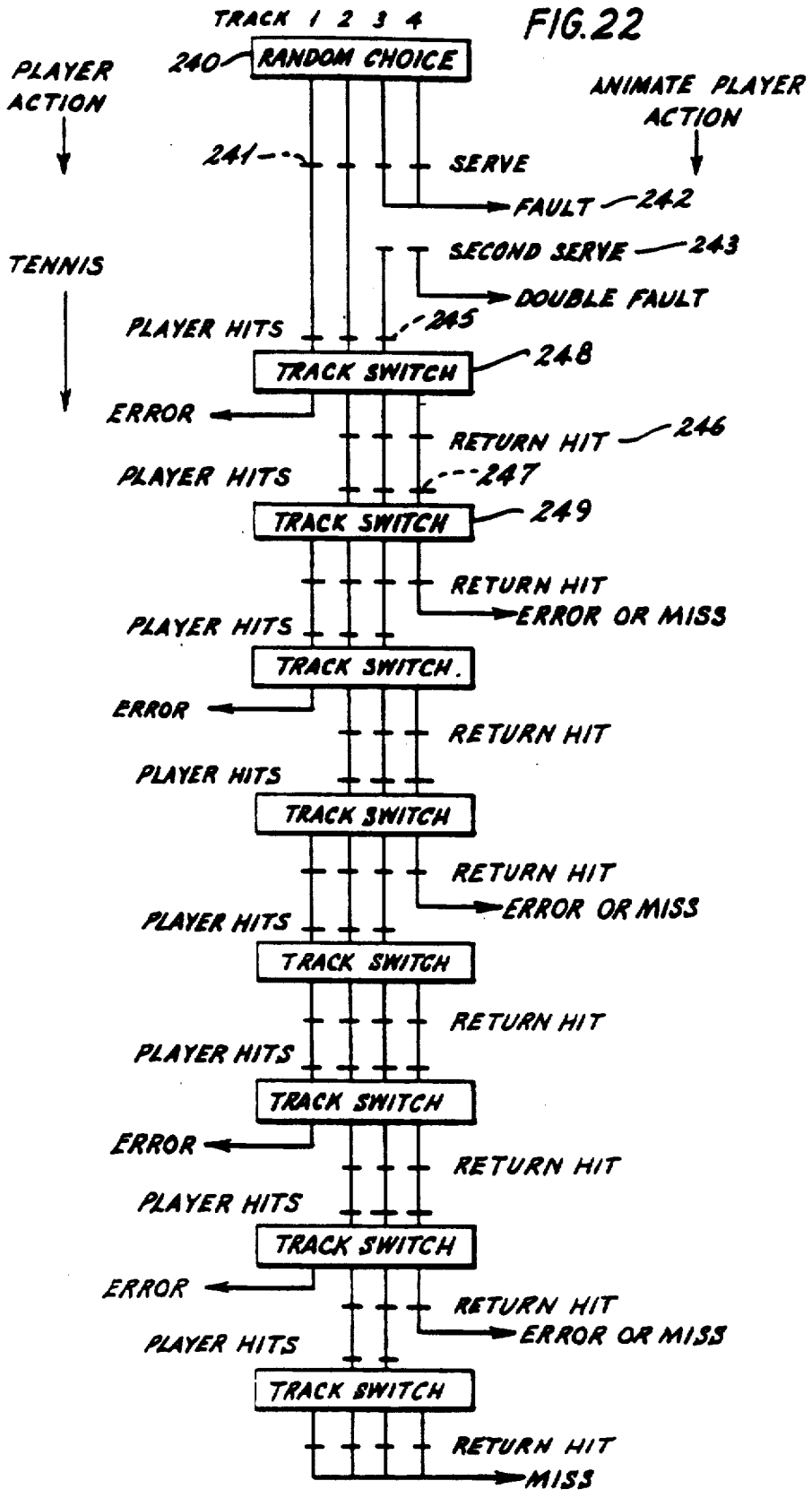
FIG. 22
TRACK 1 2 3 4
240
RANDOM CHOICE
PLAYER ACTION
ANIMATE PLAYER ACTION
241
SERVE
FAULT
242
SECOND SERVE
243
TENNIS
DOUBLE FAULT
PLAYER HITS
245
TRACK SWITCH
248
ERROR
RETURN HIT
246
PLAYER HITS
247
TRACK SWITCH
249
RETURN HIT
ERROR OR MISS
PLAYER HITS
TRACK SWITCH.
ERROR
RETURN HIT
PLAYER HITS
TRACK SWITCH
RETURN HIT
ERROR OR MISS
PLAYER HITS
TRACK SWITCH
RETURN HIT
PLAYER HITS
TRACK SWITCH
ERROR
RETURN HIT
PLAYER HITS
TRACK SWITCH
ERROR
RETURN HIT
ERROR OR MISS
PLAYER HITS
TRACK SWITCH
RETURN HIT
MISS

TV ANIMATION INTERACTIVELY CONTROLLED BY THE VIEWER

Matter enclosed in heavy brackets [ ] appears in the original patent but forms no part of this reissue specification; matter printed in italics indicates the additions made by reissue.

This application is a continuation of Ser. No. 526,464, filed Aug. 25, 1983 and now abandoned.

BACKGROUND OF THE INVENTION

The present invention pertains to an animated cartoon method incorporating a method of motion picture branching as controlled with human skill. The action of the user switches the display to make the picture respond interactively. A plurality of means for such action are specified in this invention. The preferred means for embodiment herewith described is ultrasonic position detection or simulation. The system matches readouts from an ultrasonic transducer and microphone combination placed on the face of a television monitor, or at angles to the user's game action, and from digitally coded data on a videotape, disc, or film, all in the context of a video game or educational system.

Prior-art video game devices enable players to control video images via buttons, knobs, and control sticks or wheels. These operating devices exercise limited finger movements and in no way simulate the actions and skills required of the player in the real-life games simulated by the video games.

Prior art systems are unable to allow the player to strike, throw-at, hit, or shoot a gun at the television monitor and hit a moving animated character or object and change the action multiple times at frictional to several second intervals in the course of an animated scene according to accurate drama and according to the skill of the player or operator in so doing.

Prior art systems are unable to allow the user to swing a baseball bat, tennis racket, or other game instrument interactively in accord with the projected perspective of the animated scene, in front of the television monitor, and thus hit or change animated projectory according to a game or dramatics.

Another problem endemic to the prior art systems with digitally produced animation is the confined and restricted graphics which coincide with needlepoint art in the large grid squares. Primarily two dimensional, such digital animation is inferior to the camera-originated and the computor type animation of theatrical productions. Accordingly, it is the object of this invention to afford the three dimension effectiveness of the camera-originated type animation to video game grapics which are controlled by the player.

Prior art video branching system use apparatus that switches between two or more channels or picture quadrants on the conclusion of a scene or dramatic action. Such switching depends on the viewer's judgement as expressed by pushing, buttons, other restricted video game controls, or a voice response as in the embodiment of U.S. Pat. No. 4,305,131 issued to Best. The result of such switching or branching is the beginning of another scene, episode, or game action. Different type actions can be animated in a transition number of frames into a common matching drawing that affords multiple branching, but these converging actions terminate the multiple different actions, and result in multiple beginnings of actions.

Accordingly, it is the object of this invention to provide an animation method that affords rapid and repeated switching from and to continuously radically different types of action smoothly, logically, and according to the dramatics.

Another object is to simulate the exact playing action, requiring the player to exercise the same muscular coordination, eye-hand coordination, and kinesthetic skills of the real-life game or dramatic action.

Other objectives are to create a camera-originated three dimensional visual game simulation of the view from a player's eyes that approaches reality; and to accompany the foregoing with the audio voices of umpires, spectators, and scorekeepers together with the sound effects of the operator's and the animated player's action.

SUMMARY OF THE INVENTION

The foregoing objects and others are achieved in accordance with the principles of this invention by an ultrasonic transducer and microphone combination that produces a signal which is responsive to the placement of the head of the invention playing instrument on a plastic shield which is over the face of the television monitor. This signal is converted to digital form and compared to a digital readout from the coded motion picture frame of the animated object location and displayed at the time of the instrument contact. This comparison is used to determine a specific alternate track and a switch by the multiple track video apparatus to that track, or to determine that the player had missed and the animation should continue on the same track.

In one embodiment a playing missile such as a ball or dart is cast by the player at the face of the television monitor. A point microphone combination placed on the monitor face and and below on both sides of the path of the thrown missile are responsive to an ultrasonic transducer in the missile, and produce digital signals which measure the path of the missile, the speed, and the contact. A readout of this contact digital position is compared to the digitally coded animation.

Three or more point microphones are placed on the monitor face and below a baseball batter, or a tennis player, as a configuration similar in use to a home plate or a base position. The playing instrument, bat, or racket contains an ultrasonic transducer at the simulated ball-contact point. As the player swings the instrument at the animated illusion of an approaching ball, the angles and distances between the transducer and microphone are measured in respect to the passage of the transducer over the simulated home-plate playing and hitting area. The resulting digitally determined mid-air position is compared to the coded animation as a projected position in front of the television where the animated ball illusion would travel if it were reality, and where the player would hit the ball. The speed of the player's swing may also be measured from the microphone readout, and this factor may effect the animated ball return in the event of a hit ball. In the event of a hit or a coincidence of the digital numbers during comparison, the proximity of the exact coincidence, and the angle of coincidence may effect the swinging and resulting ball return action.

Other methods are described that allow the action or the voice of the user to switch the display to make the animated picture respond interactively.

The animation method of the invention applies to multiple tracks of operating animation and the switching thereof. Rapid and multiple switching may occur in the course of a scene of only several seconds duration without effecting the followthrough and smooth action of the animation drawing progression or the illusion of reality. This is accomplished by a method of forced relating and joining interwoven, parallel, and converging animation paths and thus affording switching, back and forth, at close intervals, and by a method of delayed switching to compensate for animated illusion factors or dramatic factors simulating nature.

The system consists of a plurality of game or educational episodes of a minute or more duration and that allow a plurality of switching points.- as a tennis volley or a player at bat during a baseball game. On the conclusion of each of these camera-originated animated film episodes, the system switches to a circuit of digitally produced animation displaying scenes that score or supplement the video game or educational system. During this period a random number device may select one of the sixty to a hundred episodes of animation—in the preferred embodiment—and a rewind to the selected episode is effected. Thus the system of multiple scenes interactively switched by the action of the user and multiple episodes that may be determined by random choice, user action, or user choice creates such a complexity of graphic pattern and dramatic odds that the uncertainties of reality are simulated although the animation is pre-photographed, prerecorded, and programmed.

The preferred embodiment of the invention incorporates a single track that carries the audio and picture combination of four different animation actions which in the absence of other processing would be displayed one in each quarant of the television tube. The system incorporates blanking circuitry which eliminates video signals from all but one quadrant and circuitry that selects this television action in one quadrant and then centers and expands the picture to occupy the entire raster of the tube. The concept is detailed in U.S. Pat. No. 3,837,003. The audio in U.S. Pat. No. 3,845,498.

DESCRIPTION OF THE DRAWING

The invention will be more fully comprehended from the following detailed description and accompanying drawing in which:

FIG. 4 diagrams ultrasonic transponder transmission of pulse waves to a single-point receiver.

FIG. 5 diagrams pulses transmitted and received.

FIG. 6 diagrams transmitted and received pulses graphically explaining the Doppler Effect.

FIG. 22 is a schematic diagram of an episode of the animation method as one embodiment of a tennis game volley.

DETAILED DESCRIPTION

Figure 1:
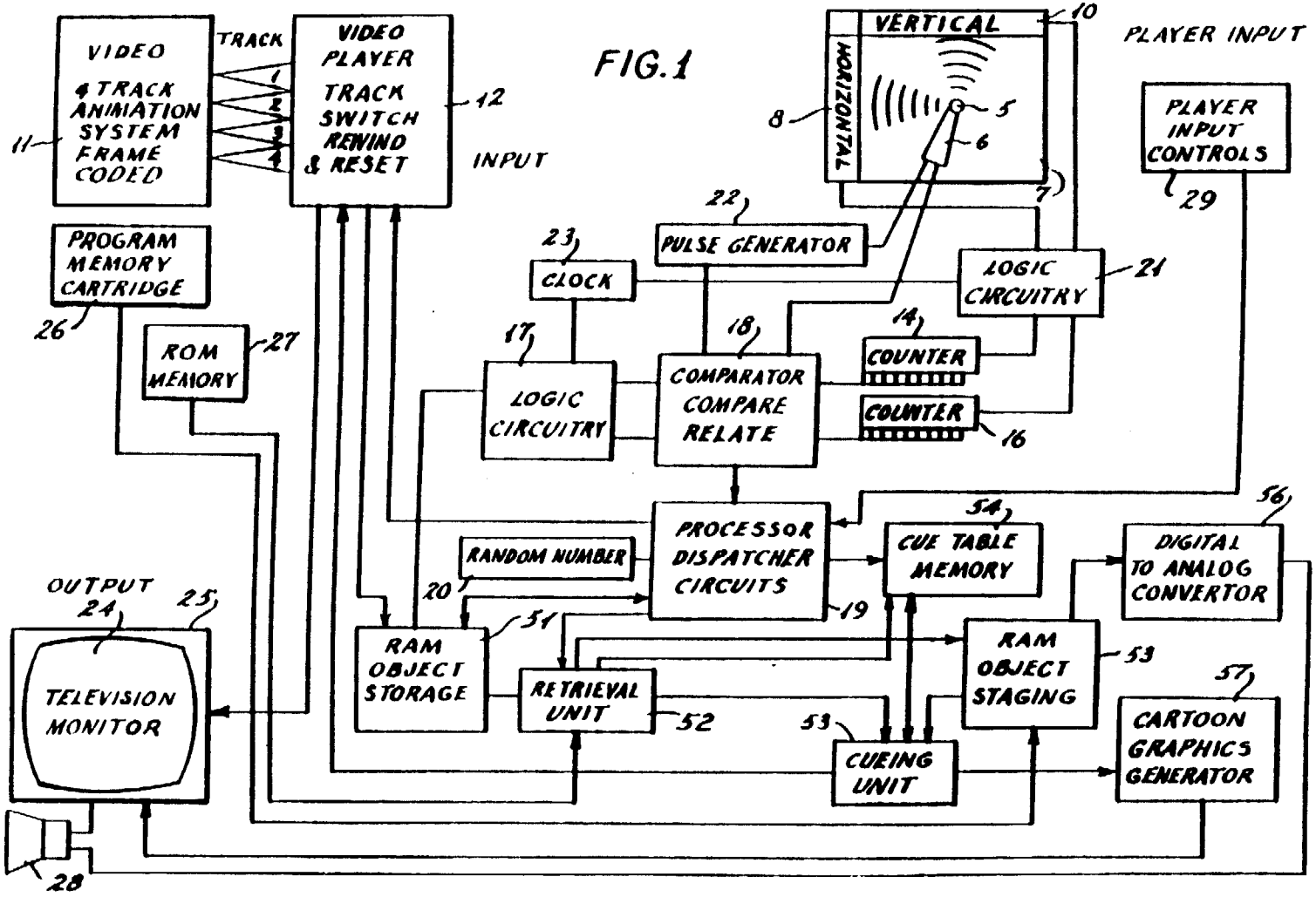
FIG. 1 is a schematic block diagram showing one embodiment of the invention using a video-tape and a video-tape reader for the primary circuit and a secondary circuit of digitally produced animation for scoring and diagram scenes.

Referring to FIG. 1 there is shown a block diagram of the invention video amusement system as an embodiment of two different types of video-game circuits. The primary circuit incorporates camera-originated motion pictures with audio as supplied by video tape 11 and video tape player 12. The invention method of animation switching is incorporated in the animation art and coded in the track 1. At the completion of a game episode the tape rewinds to another game episode according to a random number device 20 (psuedo-random number device). During this rewind a secondary animation circuit displays the scoreboard with the score of the game and related audio. The secondary circuit incorporates digitally produced animation. In embodiments the secondary circuit may supply the audio of audience response, score announcements, and the video of superimposed scores similar to a DX run on an animation camera. The secondary circuit embodiment diagrammed in FIG. 1 is prior art which is described in detail in U.S. Pat. No. 4,305,131 Best. The embodiment diagrammed is incorporated in said patent of a video game system which affords simulated conversation and voice orders between the human operator and the apparatus. Accordingly, the complete apparatus diagrammed in FIG. 1 may be enlarged to constitute a video game that allows the player to talk to, and answer questions from the apparatus with verbal response and orders that effect the course of the animation, and to touch or otherwise contact the animation picture and effect the course of the animation, or a combination of both verbal response and player contact with the televised animated character.

The invention encompasses the multiple combinations and variations of the specified elements of the invention. For example, the player's skill or mental choice as indicated by touching or speaking creates a change in the animation as described herewith. Hundreds of other scenes may follow that are a continuation of the player's choice or skill as specifically related to this one original scene. Instead of a rewind to another scene or episode that is determined by random number mechanics, as specified in the preferred embodiment, the player's action or choice may determine rewinds to another scene or episode. During such rewinds the secondary circuit displays digital animation scenes as described in the preferred embodiment; however, the scope and spirit of the invention encompasses the obvious addition of video disc player or another tape player to the invention secondary circuit tat would effect a continuous series of camera-originated animation scenes. Further, the use of the word "animation" in the present invention application in no way restricts the obvious scope and spirit of the invention to hand drawn animated graphics. The invention encompasses any type of timed or humanly manipulated motion pictures. Such scope encompasses optically-timed live-action motion pictures and computor type motion picture graphics.

Referring to FIG. 1, a clear transparent sheet of heavy plastic 7 is installed over the screen 24 of the television monitor 25. The two strip microphones 8 and 10 are mounted along the mutually perpendicular edges of the sheet 7 in a position above and at the side of screen 24. A playing instrument 6 includes a tip 5. Instrument 6 is connected to a pulse generator 22 which causes the tip 5 of instrument 6 to produce repetitive ultrasonic pulse outputs. The ultrasonic pulses can be produced by a ceramic transducer or high voltage sparking between two electrodes on the instrument 6. Instrument 6 also includes an internal switch which indicates whether or not the contact tip 5 is in contact with the surface of sheet 7.

The two strip microphones 8 and 10 are responsive to the ultrasonic pulses produced by instrument 6. These microphones 8 and 10, in conjunction with clock 23, counters 14 and 16, and logic circuitry 21, measure the time for the propagation delay between the radiation of a pulse at instrument 6 and its arrival at the respective microphones 8 and 10. Logic circuitry 21 can comprise circuits well known in the art for combining the outputs from microphones 8 and 10, pulse generator 22 and clock 23 to control counters 14 and 16 which count or measure the time delays. Counters 14 and 16 also comprise known electrical circuits. The measured time delays establish the coordinates of the location of contact tip 5 on the surface of sheet 7 at the time of any particular pulse output. The foregoing method of ultrasonic pulse measurement to establish coordinates of an instrument contact location is prior art. The application of this ultrasonic method to a television video recording apparatus using the invention animation switching method is unique and unknown in the art.

The animator's field position of the vital target point in the animated character or object is entered by the animator on each frame of the production exposure sheet that instructs the exposure of those drawings of animation that detail an object in a position to be contacted, fired at, shot, hit, touched, or otherwise effected by the player's action and skill. Such locations per frame are converted to digital binary coordinates. The motion picture frames are counted, specified, and used to enter a table of values holding these object or character positions and vital data on the tape or disc at the beginning of each episode. All of these numbers are stored in the circuit R A M 51 of FIG. 1 and retrieved when applicable to the animation action and video game play. This process is simpler than recording the data on each frame as it appears. The frame number is recorded at intervals on the video tape track 11 and used as a track guide instead of a frame meter which would create problems in the event of a tape breakage. Special track coding allows fast rewinds to specific frames located from track signals. Referring to FIG. 1 (may be FIG. 11) the coded field positions with frame numbers are stored by player 12 from tape or disc 11 into R A M 51 at the beginning of each episode. This table of values in R A M 51 supplies pertinent data to logic circuitry 17 on time to be compared to the coordinates of the player's actions and skills as described heretofore in the various embodiments of position determination.

The comparator circuit 18 of FIG. 1 compares the two field coordinates derived from the digital readouts of counters 14 and 16 to the two coordinates of the animation target position from logic circuit 17 and R A M 51.

The comparator 18 instructs the processor circuit 19 if the player has scored a hit at, or close to, the point of coincidence, giving the degree or proximity of the hit to the point of coincidence and the angle of animation progression that will result from an off-center hit. Based on this data an order for a track switch, if indicated, is dispatched by processor 19 to video tape player 12 which switches between tracks 1, 2, 3, and 4 based on the program of the episode and track instruction from program memory cartridge 26, R A M 55, and cueing (cuing) unit 53.

Referring to FIG. 1, the secondary circuit animation and scoreboard graphics is generated by cartoon graphics generator 57 from digital data which may be read along with digitalized audio from R O M memory 27 or other magnetic mass-storage device. Retrieval unit 52 is a conventional peripheral input controller which stores into memory the digitally coded blocks of information obtained from R O M memory 27. This information includes control data which retrieval unit 52 stores into random access memory (R A M) 51 for use by dispatcher unit 19, and audio and/or graphics data which unit 52 stores into R A M 55 for use by cueing unit 53. The control data includes cue commands and schedule commands. Cue commands specify short term operation during an interval of time, while schedule commands represent longer term points in time, and form chains which define and relate to alternate (multiple track) schedule. Dispatcher 19 controls the course of the animated cartoon or scoreboard audio-video and stores cue commands into cue table 54. Cueing unit 53 executes the cue commands. Cueing unit 53 repeatedly scans cue table 54 to get commands telling it what to do and the time it should done. Dispatcher unit 19 may request successive blocks of control information from retrieval unit 52 and output into cue table memory 54 a schedule (called a cue table) of operations for cueing unit 53. Dispatcher 19 repeatedly updates the cue table schedule as the cartoon progresses. Dispatcher 19 processes the various optional player input control 29 which may be input via the conventional video game hand-held instruments and stores the different player commands into cue table 54.

As described, dispatcher 19 controls the course of the cartoon and stores cue commands into cue table 54. Cueing unit 53 executes the cue commands at the times specified therein by conveying to the cartoon graphics generator circuit 57 blocks of binary-coded data previously stored into R A M 55 by retrieval unit 52, and these blocks of data are used by the cartoon graphics generator 57 to generate cartoon frames which are then displayed on television monitor 25. Digital audio passes from R O M memory 27 through retrieval unit 52 to memory 55 to digital to analog converter 56 and hence to system speaker 28. The binary coded data stored into R A M 55 is reinforced by individual game data supplied by program memory cartridge 26. The circuits described as components of the secondary digital animation circuit are known in the prior art.

The primary four track video tape animation circuit of the present invention, which is diagrammed in FIG. 1, is operated and scheduled by the processor dispatcher 19 which has control of the course of the camera-originated animation. The comparator 18 furnishes the results of the player's action to the processor 19 which instructs the switching of tracks 1, 2, 3, and 4 with game position to video tape player 12. At the termination of a game episode either random number generator 20, player input 29, or instrument 6 placement on sheet 7 specifies an episode to processor 19 which instructs tape player 12 of the ewind. The progress of the game comprising both animation circuits is controlled by processor 19 based on data from program game memory 26 and R O M memory 27 and the operation of the secondary circuit retrieval, cueing, and memory circuits as described above. As ordered by processor 19, this instruction is sent to tape player 12 by the cueing unit 53.

The invention operates using film, video tape, video disc, or digital stored and/or generated animation. All of these video mediums can be coded and adapted to the invention circuits and apparatus. The embodiment described is video tape.

The motion picture film embodiment of the invention operates using multiple film tracks of operating film read by multiple heads, multiple tracks of animation exposed on one motion picture film in a parallel or alternate exposure, conventional single frame exposure with each frame carrying a picture combination of four quadrants, and multiple tracks of such quadrant type film. All of such film methods may be incorporated in film cassettes. Film quadrants are masked in projection. Such film is projected on screens that are related to the microphone installation described. The large and wide screen projection afforded by film creates a panoramic animation display that is interactive with the player or human operator use of large instrument simulations as airplane cockpits, automobile driving interiors, or various weaponry all of which move when guided by the player during action requiring a simulated skill. Simulated audio effects and the use of voice recognition, command, questions, and animation reaction to such audio adds to the simulation effect.

In FIG. 1 the digital memory cartridge 26 can be various types of memory and may be plugged in to change the scenario. And, memory cartridge 26 may supply the coded animation used by the primary circuit of the invention.

The video tape embodiment of the invention may operate using multiple video tape tracks read by multiple heads, multiple video and audio tracks incorporated in a single tape on a line sharing basis, or a single track signal that carries a picture quadrant using a blanking circuit that centers and enlarges the selected picture, or a combination of the above methods.

Figure 2:
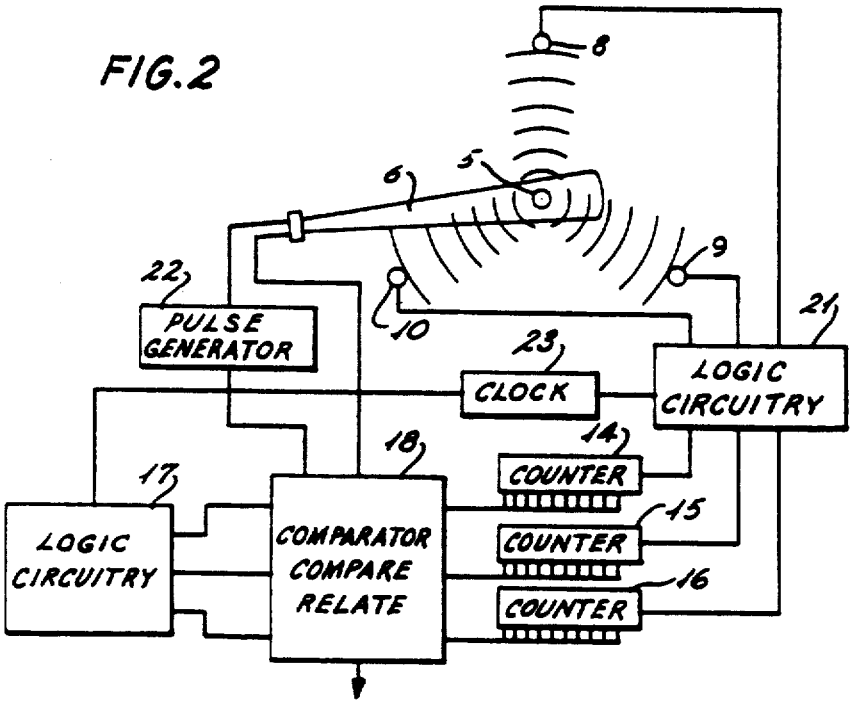
FIG. 2 is a schematic block diagram of an alternate section of FIG. 1. The method incorporates three single-point microphones placed in a triangular pyramid configuration before the television monitor as illustrated in FIG. 3. The microphones measure the distance from a mid-air transducer inside a swinging playing instrument. The digital coordinates of the mid-air ball hit position are compared to the coordinates of a projected position of the perspective in the animation action displayed.
Figure 3:
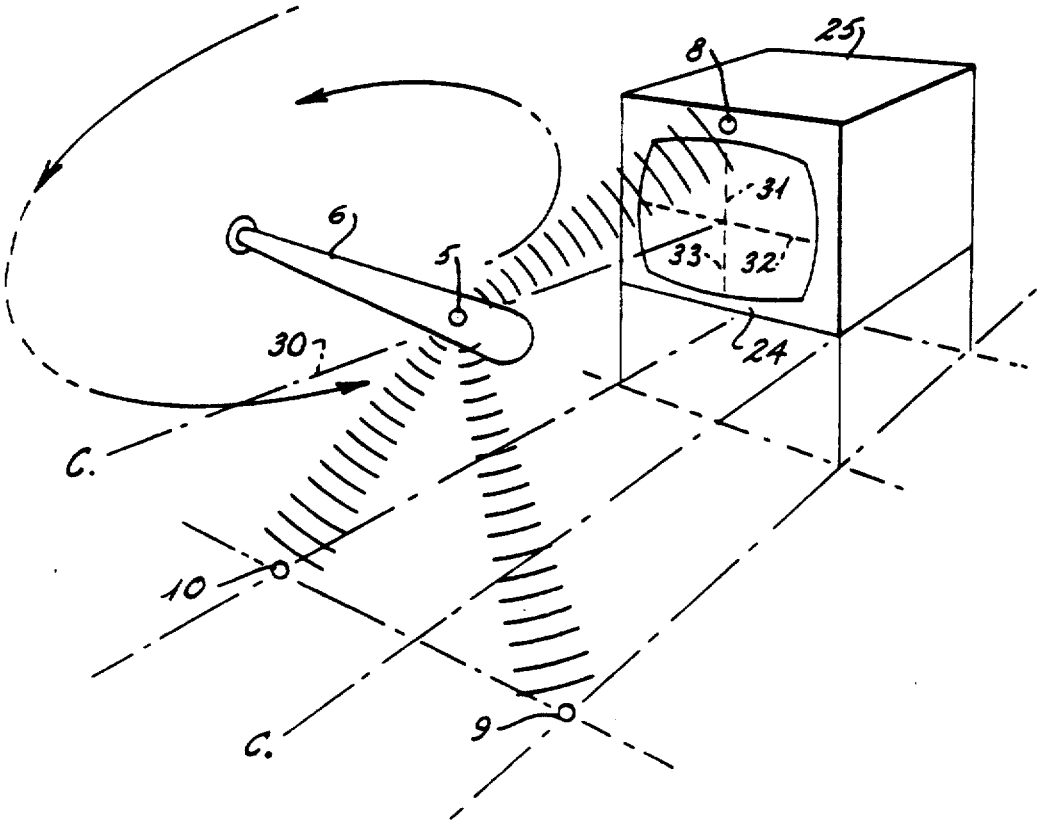
FIG. 3 illustrates the placement of the single-point microphones in a triangular pyramid configuration with the playing instrument transducer before the tlevision monitor.

An embodiment of ultrasonic position detection FIG. 2 and FIG. 3 incorporates an installation of single-point microphones for the face 24 of television monitor 25, which is the location of microphone 8, and to the right and left of center on the floor, which are the locations of microphones 9 and 10. The circuitry of counting the microphone reading of pulses is similar to FIG. 1. FIG. 2 is a block diagram section which replaces the similar circuits and apparatus of FIG. 1. Using the three triangular formation variable measurements, 5 to 8, 5 to 9, 5 to 10, a mid-air location of the hitting point transducer 5 of the swinging bat is determined and interactively related to the animation—which may be a baseball pitcher throwing a baseball, in perspective, at the player. Simulating reality, the player swings the bat 6 or racket at the oncoming animated ball. As the transducer 5 in the bat passes a mid-air position over the plate (or triangular microphone installation) where the perspective projection of the animated ball (if it were real) would be hit, the proximity to coincidence of animation code position and player instrument is determined, the angle between ball code position and bat hit position 5 is determined, the velocity of the player's bat is measured from the microphone readout, and the animation reacts accordingly.

In other embodiments of ultrasonic position detection the playing instrument 6 of FIG. 2 or FIG. 3 may be a portable missile such as a dart, rubber ball, schuttlecock, or suction tip arrow that comprises batteries, electrodes, and switches to effect ultrasonic pulse output. A switch assembly may be intalled under the sides of a clear plastic shield over the face 24 of the television monitor 25 of FIG. 3 that would be respective to pressure on the plastic shield, and thus indicate the point in time of missile contact. The position of the thrown missile is calculated by three vectors 5-8, 5-9, 5-10 diagrammed in FIG. 2 and FIG. 3. Another embodiment uses the two strip microphones 8 and 10 of FIG. 1.

Various means of ultrasonic measurement may be used according to game needs, distances, and vector geometry. FIG. 4 shows an ultrasonic transponder XMIT 1 which transmits audio waves 2 or pulses in response to an electrical signal. These are received by single-point microphone REC 3. FIG. 5 shows these pulses transmitted in position 4 and received at position 5. To avoid problems with ambiguity, the transmit pulses must be spaced in time farther apart than the longest distance of interest to be measured. A clock or digital counter is set to zero by the transmit pulse and started up.

When the first part of the received signal arrives the timing is stopped. The time $t_x$ of 5 can be converted to distance when the velocity of sound in the medium is used as a scale factor. This process is simple if it is all in one plane, and if point receivers and transmitters are used, and there is no reflections. An additional measurement can be made using the Doppler Effect. Refer to FIG. 6 position 6. This is the same as FIG. 5 position 4 and represents the case where the transmitter XMIT is not moving relative to the receiver REC. If the tranmsmitter XMIT is controlled to send out pulses at fixed time intervals measured within the transmitter, the additional Doppler Effect measurement can be made. In FIG. 6 position 7 the transmitter is moving toward the receiver and moves the distance X 9 between pulses. Likewise as in FIG. 6 position 8 where the transmitter is moving away a distance Y 10 occurs. The Doppler Effect is determined by measuring the frequency of the received pulses. This measures the velocity of the transmitter relative to the receiver, and is a factor in determining the velocity of the transmitter playing instrument.

Figure 9:
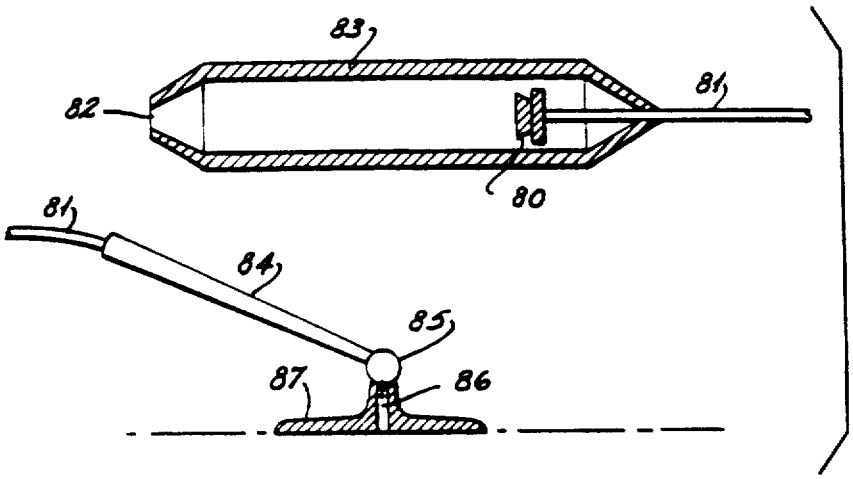
FIG. 9 is a cross section diagram of a playing instrument, light pen, or other embodiment incorporating a photo cell or diode light measurement.
Figure 10:
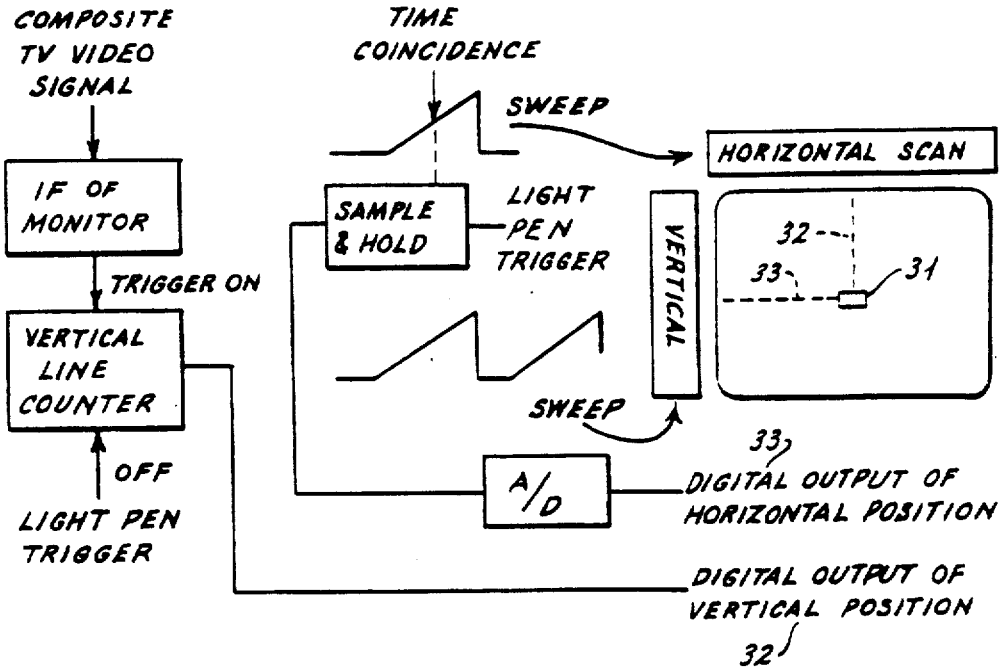
FIG. 10 is a schematic block diagram of an alternate section of FIG. 1. A light pen or other embodiment of this light measurement device incorporates the diagrammed circuitry to establish player determined position coordinates which are compared to coded animation coordinates.

An embodiment of position detection incorporating a Light Pen is diagrammed in FIG. 9 and FIG. 10. The Light Pen is so called because it is used like a pen - but it does not produce any light. In FIG. 9 a photo cell or diode 80 is enclosed in a case 83. An opening hole 82 allows light exposure to reach the diode 80 which is connected by, and signals on, the wire 81. Such device is incorporated as part of a playing instrument of the invention video game—or educational system. The Light Pen is held on, or close to, the face of the TV CRT with the opening 82 lined up parallel to the face. The detector inside produces a pulse when the cathode ray beam of the television sweeps past the Light Pen opening 82. The pulse signal is used to "tell" the system where the Pen 83 is located by referring the pulse back to the sweep circuits of the TV system. Referring to FIG. 10, the horizontal position is found by taking a sample of the sweep voltage at the pulse time, and from this determining the percent of the sweep or time. The vertical position of the Pen contact is determined by counting the sweeps to the contact point on the face of the monitor. The Light Pen device may be encased in a plurality of forms or playing instruments. One embodiment similar to a spatula is illustrated in FIG. 9. The handle holds a limited movement knuckle joint 85. The Light Pen 86 is encased in the extension from the knuckle joint 85 to a contact surface 87 which may be in multiple shapes including a strung racket to simulate a badminton racket. Thus the player touches the television face with the simulated racket to hit and return an animated schuttle-cock across the net to an animated opponent.

Figure 7:
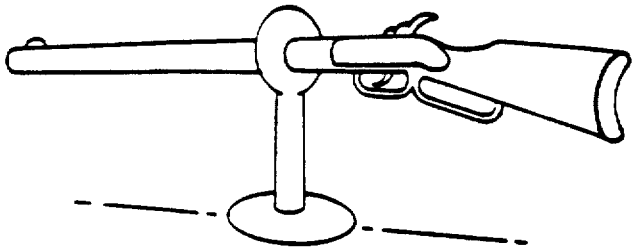
FIG. 7 is an illustration of a rifle version of a video game Joy-Stick instrument used to control a cursor.
Figure 8:
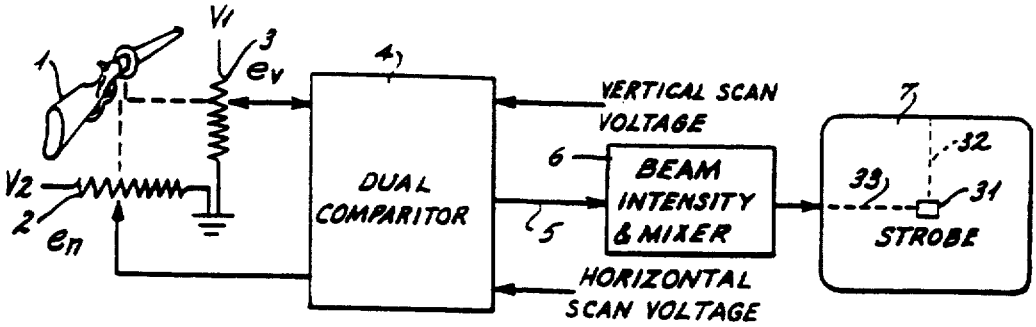
FIG. 8 is a schematic diagram of an alternate section of FIG. 1 incorporating the Joy-Stick rifle as a rheostat determining the strobe position on the television monitor. The coordinates of the strobe position are compared to animation position coordinates as diagrammed in FIG. 1.

Other embodiments of position detection incorporate known circuits and devices as those named a Mouse, a Tracking Ball, and a Joy-Stick. The Tracking Ball and Joy-Stick use the same type of circuitry as diagrammed in FIG. 8. Such devices control the movement of a strobe, a cursor, or some other displayed element. FIG. 7 illustrates a mounted rifle playing instrument which is a variation of a Joy-Stick. The aiming of the rifle in a socket joint moves rheostats 2 and 3 as shown in FIG. 8. The voltage readout effects means which are well known to effect a strobe. Pulling the trigger of the rifle activates the apparatus. Using this position orientation as a guide the player reaims the rifle to hit or cover the animation target and effect the animation via the unique means of this invention. Other circuitry for the rifle device uses a simple switch, rather than the voltage readout. The switch turns on a counter which is shut-off by the player when the strobe spot is in the desired position. The counter signal can be used to move the strobe or cursor—and activate means giving a digital readout to compare to the coded animation position. Combinations of such strobe position means may be incorporated with the previous devices described as additions to enhance simulation.

The animation method comprises means of rapid and repeated switching in multiple possible directions from converging multiple directions in paths of action, and in this process retaining a continuity of shape progression that is dramatically believable and does not violate an illusion of reality while retaining widely divergent drawing in the key extreme positions between the different actions and thus retaining the character of each action. The invention applies this method to a system of multiple switching positions that may be spaced (timed) as close together as twelve frames (½ second) or longer periods that amount to an entire scene. A plurality of such switching positions may occur at even intervals or widely variable intervals during the course of the animation.

Figure 11A:
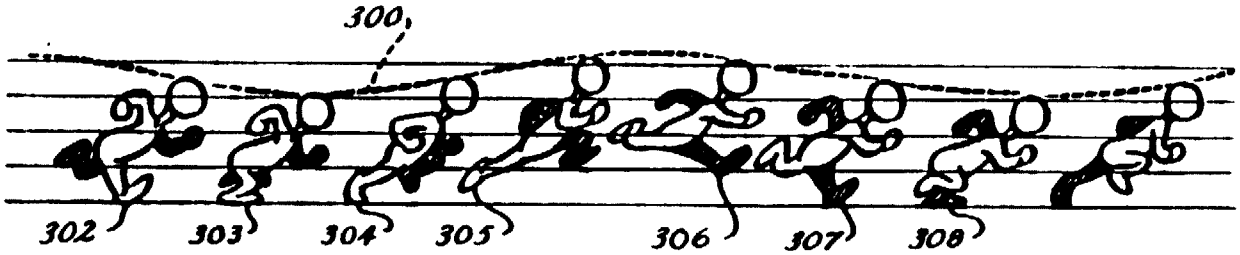
FIG. 11(a) and 11(b) are illustrations of animated walk and run cycles. The primary path of character action is shown. The illustration of the run cycle reveals a wider action in the path of the character drawings.

For an understanding of animation technique, the reader is referred to two art instruction books by the inventor, Preston Blair, titled: "Animation" No. 26 and "How to ANIMATE Film Cartoons" No. 190 published by Walter Foster Art Books. The examples of an animated walk and run cycle illustrated in FIGS. 11(a) and FIG. 11(b) are from "Animation" No. 26.

The invention can accommodate the switching at certain times in an action to make the animation look smooth. At these proper moments in a movement a degree of forced drawing is introduced to also accomodate the switching. The types of switching points of the invention are illustrated in diagrams and drawings in FIGS. 11(a) through 20.

Figure 11B:
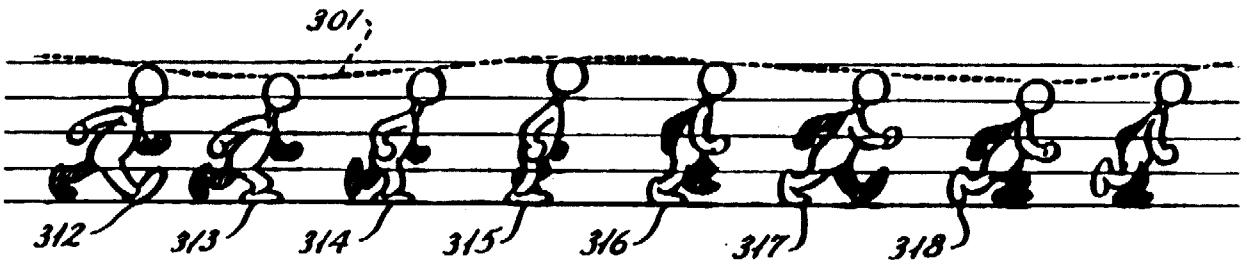
Figure 12:
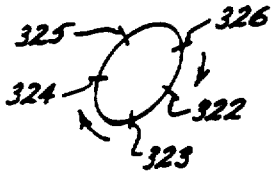
FIG. 12 is a diagram of a path of action for a character running or walking in a stationary position on a moving pan background.
Figure 13:
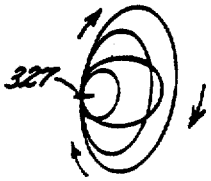
FIG. 13 is a diagram of four different character paths of action all moving on a pan background, and all incorporating a coincidence at the lift drawings in these cycles of the same animated cartoon character.
Figure 14:
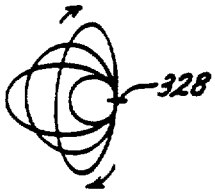
FIG. 14 is a diagram of four different paths of action, all moving in a stationary position on a moving pan background, and all incorporating the coincidence of a forced drawing at a universal position in the sinking action of the cycles.

In FIG. 11(b) the path of action 301 indicates the primary direction of movement of the character in a walk cycle. Path of action 300 indicates the wider movement of a run cycle. The paths of action referred to in this invention are these primary or principle paths of action of the entire character mass, as indicated by paths 300 and 301. Secondary paths of action in a character as the reversing swing of the arms and hands and the circular lifting and falling of the feet action with other secondary animation paths may, in certain scenes and staging, become the primary action of the scene.

An animation character walk or run cycle constitutes two steps or forward leg actions. The switching points of the invention occur at points where all converging animations have the uniform right or left leg action. In FIGS. 11(a) and 11(b) the extremes of action are the point of foot contact 302–307 and 312–317, the recoil position 303–308 and 313–318, and the high lift position 305 and 315. The extreme arm and leg positions of the walk 302–307 and run 312–317 have silhouette definition that separates and gives character to each action, whereas, the method points of silhouette loss and action convergance are during the upward lift action 304 and 314. The action drawing at these points is forced into a brief proximity by the invention method for switching purposes. The method forcing or revision of the action in both side-view cycles is effected without damaging or causing the two actions to look like each other. The reason is that the vital silhouettes of the different looking extremes have not been tampered or altered. In side-view actions, as here illustrated, switching occurs—and method forced drawing occurs—at areas of animation wherein silhouette definition is lost, which is due in this case to the passing of the arms and legs in action. Other cases of silhouette loss and opportunity for method forced drawing occur in foreshortened perspective action. These are actions wherein the character is progressing directly at, or away from the viewer. An opportunity for the method forced drawing occurs in most animated actions. The method is illustrated by different golf swings as diagrammed in FIG. 20. The wind-ups 338 differ widely in path and character drawing as do the follow-through actions 337. The method switching and forced drawing is at the ball contact 336 when silhouette definition is lost. Position 336 also illustrates another method switching and forced drawing point in an animated action. Such points occur at the center of widely spaced or fast actions. This type of switching point is diagrammed in FIG. 15 position 329. All types of leaps, jumps, dives, or other quick actions contain such switching and forced drawing points that allow for the method. The movement of the background effects the pattern of paths of action. The walk and run cycle becomes circular in the example diagrammed by FIG. 12 wherein the character progresses in a stationary area while on a moving pan. The switching method point of FIG. 12 cycles would thus be at the rising action point 324 or 325. Four such cycles thus converging momentarily for switching in FIG. 13 incorporate the switching point at the lift 327. Other types of cycles offer switching according to the method in FIG. 14 at the sinking point 328 of the actions.

The method switching points also occur at points in actions of momentary uniformity as: parallel actions, circular reversals or recoils, angular reversals or recoils, various intersections of actions that are angular and traveling in the same direction together, a uniform turning of characters, and twirls. Obvious switching points in animation are also used by the invention as: from a pose or held position, from a point of brief disappearance of the characters behind objects, or from brief movement offstage.

Figure 15:
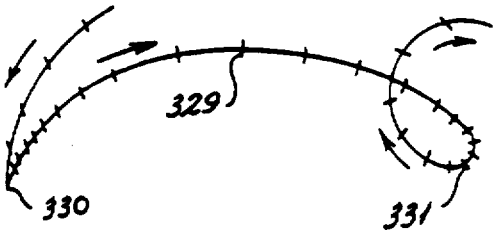
FIG. 15 diagrams an angular reversal of action, a widely spaced fast action progression of animated drawings, and a circular reversal in the path of action.
Figure 17:
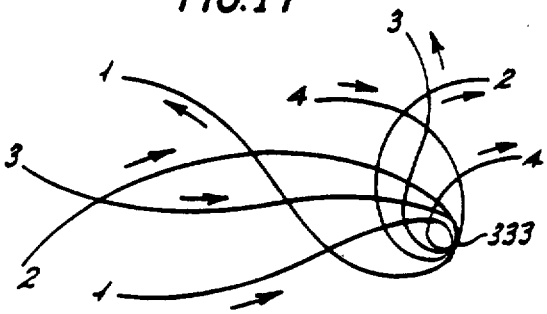
FIG. 17 diagrams four converging circular reversal actions at a drawing with forced details designed to fit all four actions and serve as a switching point.
Figure 18:
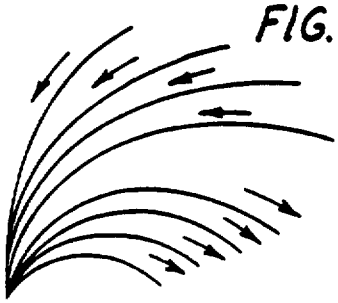
FIG. 18 diagrams four animated actions converging at the point of angular reversal in a drawing with forced details designed to fit all four actions.

FIG. 15 diagrams the method points in actions of angular reversal 330 and circular reversal 331. Both of these actions occur in recoils and many other actions. FIG. 18 diagrams four actions into a common point of angular reversal 334. FIG. 17 diagrams four circular reversal actions that incorporate method switching at point 338.

Figure 16:
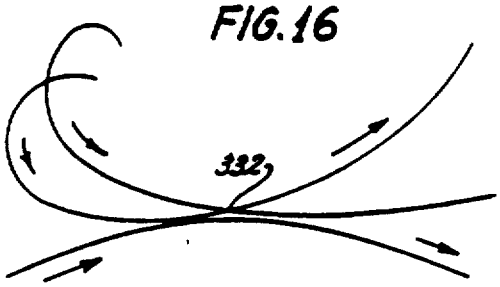
FIG. 16 diagrams a point of parallel between two different animation actions and an intersection of paths of actions that are moving in the same general direction.

FIG. 16 diagrams a method switching point at an angled intersection of two actions (moving together) and a third parallel action to the point of intersection. Thus FIG. 16 shows two switching examples: during parallel actions, and during actions with angled intersection.

Figure 19:
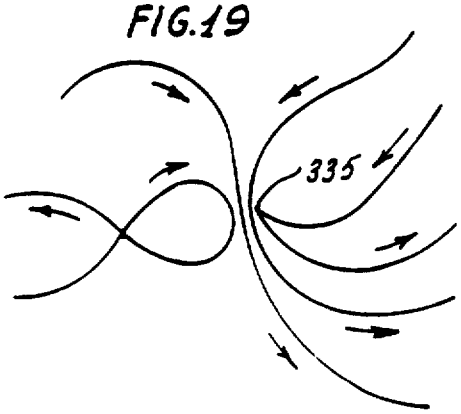
FIG. 19 diagrams a switching point of the invention animation method incorporating a circular reversal, a parallel action, and an angular reversal of animated action.
Figure 20:
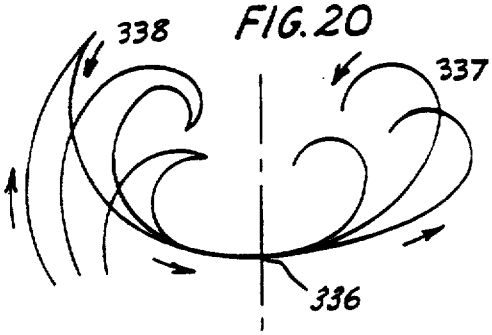
FIG. 20 diagrams three different golf swing actions that coincide according to the forced drawing method at the point of golf ball contact, loss of silhouette definition, and widely spaced fast action.

Combinations of switching patterns are diagrammed in FIG. 19. The switching point 333 combines two parallel actions with an angular point of reversal and a circular point of reversal. Accordingly, the invention method enables many different types of animated action to be connected by multiple switching points which are of multiple types in combination.

Each episode of the invention games is diagrammed or planned according to a schematic schedule. Educational system lessons are similarly planned.

Figure 21:
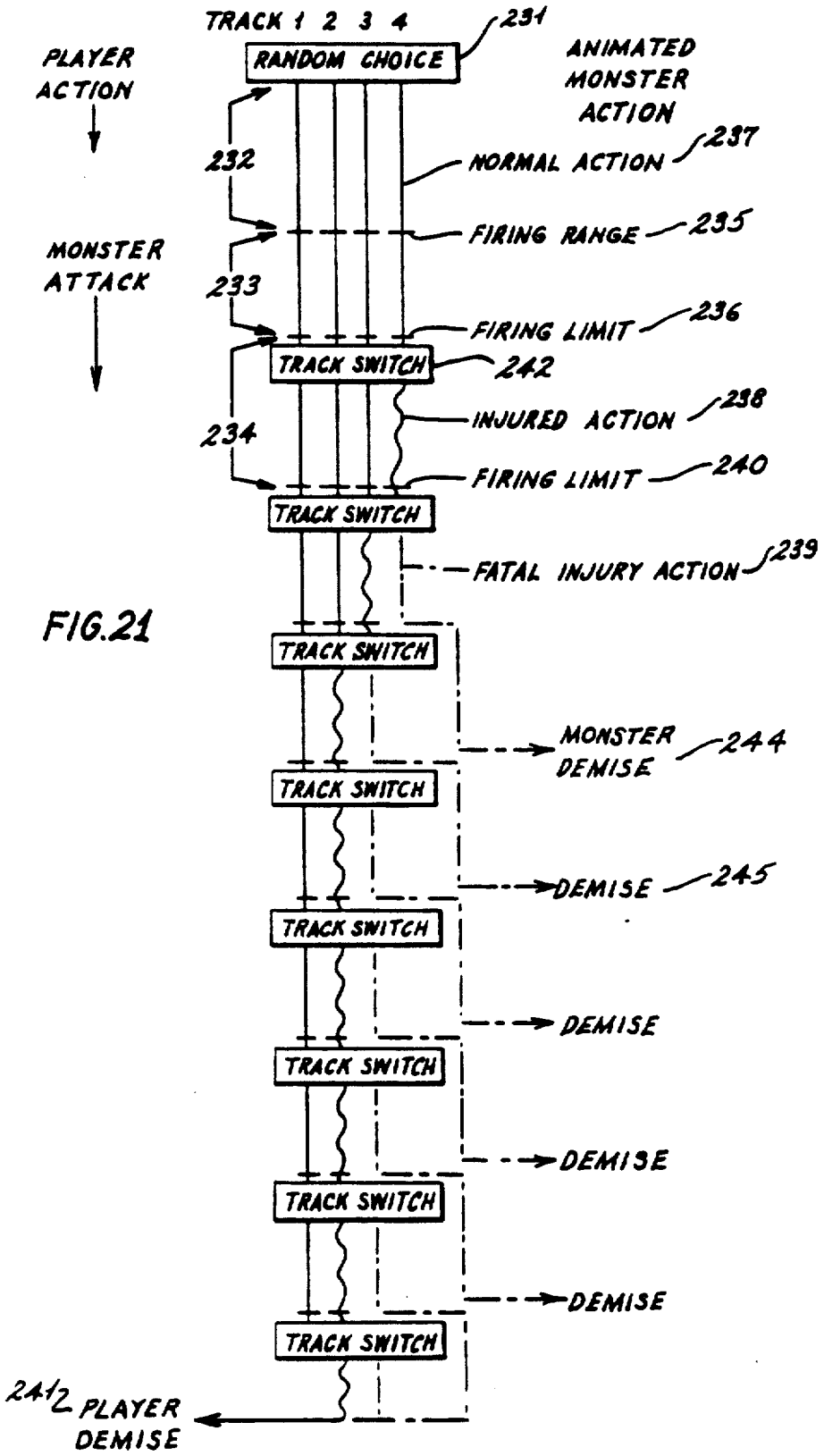
FIG. 21 is a schematic diagram of an embodiment of the animation method that schedules an episode single scene of an attack against the player by a dragon, monster, tiger, bear, cave man, man from space, or other dangerous adversary.

Referring to FIG. 21, a schematic schedule of an embodiment of a dragon or monster attack episode diagrams a three dimension foreshortened action which races forward from the the distant background directly at the player. The video tape rewinds to one of a hunded different wild animal attacks determined by random number mechanics. One of four tracks is selected by random choice 231. In area 232 the monster advances from the distance reaching the firing range of the player 235 at which time the frames are coded allowing a player hit. During the advancing area 233, a hit in a vital area of the dragon monster will effect a switch of the animation at track switch 242 to the track four injured action 238 of the monster. A scheduled delay between firing limit 236 and the track switch 242 compensates for dramatic and animation factors needed in certain actions. If the player can hit the injured monster a second time in the following advance area 234, the injured action track action is switched to the fatal injury action 239 at switching point 243. The animated demise of the attacking monster occurs at demise 243. Thus two hits are required to injure the monster and fatally wound the beast in two advancing areas. Each demise 244, 245, etc. is a different dramatic end of the monster. If the player's skill is insufficient to save him from destruction by the monster he will meet his fate at player demise 241. If the game is played by two players, the survivor is the winner. If played by two teams, the surviving team wins—or those still alive. Variations of this game and schedule incorporate space attack by alien spaceships, underwater shark attacks, aerial dogfights, or shoot-outs of western or other styles, etc. In a game in which the attacker shoots at the player, the vulnerable position of the player is registered by the player using the instrument position detection and establishment means of the invention. Such player position embodiment may incorporate a gun belt with the transducer 5 of FIG. 3 installed in the buckle center.

Referring to FIG. 22 a schematic schedule of a tennis game volley is diagrammed. The game is played by two players who alternate in volleys against an animated tennis opponent, and the game is scored exactly as tennis. At the start of each volley, the video tape rewinds to one of a hundred different tennis volleys that is determined by random choice. The volley begins with the random choice 240 (unevenly weighted) of one of four tracks of the animated tennis player preparing for the serve 241. On track 1 the serve is good and the ball animates to the foreground to a position where the human player hits the ball 245. On track 2 a similar action occurs with a different action and paths of action. On track 3 the first serve is a fault 242, but the second serve is good and the and the ball advances in a different path of action to the player hit positions 245. On track 4 the animated player double faults 244 and the volley is over. If the human player misses the ball the volley is over at track switch 248. If the player hits the ball 245, the track selection 248 and return of the ball is determined by the accuracy and the related angle of return. Track 1 hits the net in an error and the volley ends. Track 2, 3, and 4 return the ball in different patterns which converge as the animated character hits the ball at the return hit 246 back to the following human player hit position 247. The game is played from the perspective of the eye of a tennis player. The ball is hit from the distant background and comes forward in perspective to the player hitting area. As the game moves from side to side to then tennis court the perspective of the entire court is animated—using computor type theatrical animation—to simulate reality. Thus the camera-originated animation includes both the hand-drawn full character animation and the computor type animation used in science fiction features.

Many game embodiments may be simulated by the invention animation and player action. Suspense and dramatic situations place the player in a simulated danger or in positions requiring skills and reflex action. Such animation simulates, for example, the three dimensional visual action confronting the eye of a space traveler, an explorer attacked by ancient monsters in an unknown land resembling the pre-historic, an underwater swimmer attacked by huge sharks, octopuses, torpedos from enemy submarines, and frogmen denizens of the deep. An eskimo is attached by polar bears and wolves. On an African Safari rhinos, elephants, and tigers attack the player. Based on World War I airplanes, an aerial dogfight casts the player in the cockpit of a plane being attached by on-coming planes and destroying enemy planes and dirigibles according to his accuracy with a gun. The clouds of the sky pass by in the realism of feature type three dimension animation art. The player serches every mist for the appearance of the devil Red Baron and his squadron of executioners. Suddenly the sound of enemy machines guns fill the air as planes attack from every angle. If all forms of combat the player may use the ultrasonic detection means of the invention to shoot at attackers, and the ultra sonic means enable the animated attacker to shoot at or contact the player - thus ending the game. In these many fantastic adventures the player is allied and helped by friends. Dolphins help the player attack huge strange denizons of the deep sea. SUPERMAN, BATMAN, BUGS BUNNY, THE HULK, WONDER WOMAN, friendly space creatures, or the likes of DICK TRACY help, talk to the player, ask the players questions about strategy, and act according to the player's verbal response as described in the previously referenced Best ('131) patent. Thus, funny rabbits, wise owls, friendly racoons, big birds, small mice, giant dragons, and tiny insects may speak, act, and reason with the player in educational games based on player action and voice.

PING-PONG, badminton, volleyball, baseball, tennis, skeet-shooting, and other ball-return games are embodiments. Games as baseball may use camera-originated animation with diagrammatic digital animation. Games may be played on diagram scenes displaying playing boards that use episodes of camera-originated animation to advance the game play.

Other games of combat incorporate embodiments wherein the player evades being shot be gunfighters or hit by cavemen throwing stones by his movement before the face of the television monitor. A transducer mounted on the player creates a digital readout that may coincide with digital position of the oncoming bullet or other animated projectile unless the player is able to move out of the way—or line of fire.

While the invention has been described with reference to a specific embodiment it is understood that various modifioations, alternate construction and equivalents may be employed without departing from the true spirit and scope of the invention.

The invention uses are not restricted to video games, and the uses of the invention incorporate educational systems with memory circuits that record and grade the player action and response.

Alternate versions of the circuits dscribed may be used to displace those specified. Therefore, the above description, circuits specified, apparatus specified, and graphic diagrams should not be construed as limiting the scope of the invention.

The invention is the combination of the above methods, circuits, and apparatus. Such a combination results in a unique operation and unknown function in prior art, although fractions of such combination are prior art.

The invention combination is defined by the appended and following claims.

I claim:

1. A video game system providing repeated switching of multiple tracks of different actions of the same animated character according to the skill of the operator in contacting the camera-originated animation display, comprising:

multiple tracks of animated motion picture production of different actions of the same character providing coded frames for track switching and coded location coordinates of said character target, a video-audio input terminal providing means to operate multiple tracks of animation, providing for the switching thereof during operation, and providing for film track selection, masking, and centering to the full raster, a player input terminal including a playing instrument deployed before the display with a transducer and a microphone combination mounted on the mutually perpendicular sides of the face of said monitor, providing means for producing digital signals representative of the two coordinates of the location of said playing instrument with respect to the image on said monitor, means of entering a table of values representing digital coordinates of the locations of animation targets per frame and means for entering episode cueing (cuing) data into memory storage at the start of the episode, means of retrieval of said digital coordinates of the location of said target area at a designated frame from the memory storage, means of comparing and matching the coodinates of the location of said playing instrument transducer to the coordinates of the location of said animated target area retrieved from said memory storage at a designated frame, to obtain the category of proximity, means of processing and dispatching to effect the switching of multiple tracks of animation to the said video-audio terminal based on the said determined category of proximity obtained by the comparison of the location of said playing instrument transducer to animated target area and frame cueing from said memory storage, continuing means of processing and dispatching for instructing said video-audio terminal to re-wind multiple tracks of animation to another episode determined by means of random choice or player input at the termination of an episode.

2. Apparatus as set forth in claim 1 as a primary circuit, and a secondary circuit providing digital animation, digital graphics and audio scoring the game and related to the game-originated animation and player's actions, and controlling the progress of both primary and secondary circuits, comprising:

a second player input terminal providing means of system control for the said means of processing and dispatching, permanent memory means providing a mass storage of digital graphics image data for a means to generate cartoon graphics for a video monitor display, said means of retrieval retrieving said digital graphics image data from said permanent memory means for storage in a random access memory means, said permanent memory *means* providing storage of control data including cue commands, said cue commands comprising schedule commands for said processing and dispatching means, said means of retrieval retrieving said control data from said permanent memory means for storage in said random access memory means, said permanent memory means storing audio and/or graphics data for a random access memory of object video staging, said means of retrieval retrieving said audio and/or graphics data from said permanent memory means for said random access memory of object video staging, said processing and dispatching means controlling the course of the digital animation, a cue table memory means for storing cue commands from said processing and dispatching means, a cueing unit repeatedly scanning said cue table memory means to get said cue commands, and to execute said cue commands, said processing and dispatching means requesting successive blocks of control information from said means of retrieval for operations scheduling instructions for storage in said cue table memory means for use by said cueing unit, [-] said processing and dispatching means repeatedly updating said operations scheduling instructions as the cartoon progresses, said cueing unit executing cue commands at the times therein specified by conveying to the said means to generate cartoon graphics blocks of binary coded data from said means of retrieval from storage in said random-access memory of video staging, to generate cartoon frames for display on said video monitor, program memory cartridge means for providing individual game data to reinforce said audio and/or graphics data stored in said random-access memory of object video staging, said means of retrieval obtaining digital audio data from said permanent memory means for said randon-access memory of object video staging, to be sent to a means of converting digital data to analog form, and hence to a system speaker, said processing and dispatching means controlling progress of the game involving said primary and secondary circuits using data from said program memory cartridge means, said permanent memory means obtained through said means of retrieval and said cueing unit, said means of processing and dispatching ordering said control information of the game for the primary circuit to be sent from said cueing unit to the video-audio input terminal.

3. Apparatus as set forth in claim 2 utilizing the video system and monitor circuits to measure the playing instrument action and position, comprising:

means providing the playing instrument position determination by analysis of the video monitor display's cathode ray beam sweep circuits or other display drive circuits using a pulse signal from a light detector at the playing instrument position, and pulse time to determine the position of the sweep and thereby define the relative relationship of the playing instrument within the image.

4. Apparatus as set forth in claim 2 utilizing the circuits of the video monitor to effect a strobe or cursor and to measure their coordinates of scene field location, comprising:

means created by both the height N/S and the width E/W movement of the playing instrument activating respective circuits creating and controlling movements of a strobe or cursor aimed at the animation target position, and activating analysis providing a digital readout of the cursor/strobe position for comparison to the coordinates of the position of the animation target, and embodiment of a rifle mounted in an adjustable socket joint activating said N/S and E/W circuits to effect a strobe or cursor at the position on the image of the video monitor corresponding to the position aimed at by the rifle.

5. Apparatus as set forth in claim 2 including means enabling the player to operate a second playing instrument in a simulation of an athletic game, and repeatedly hit designated mid-air projected positions of displayed foreshortened perspective animated actions, and effect returns of said animated actions to the video monitor, wherein said player input terminal includes the second playing instrument containing a transducer, a configuration of single-point microphones before the face of a television monitor, and providing means for producing digital signals representative of the coordinates of the mid-air location of said playing instrument transducer with respect to the said microphone positions, wherein said means of entering a table of values enters the mid-air location, and wherein said means of retrieval retrieves the mid-air location, and wherein said means of comparing and matching compares and matches the mid-air location.

6. Apparatus as set forth in claim 5 including means providing a video game based on the speed of the playing instrument and the resulting effect of such speed measurements in the displayed animation action, comprising:

said player input terminal including the second playing instrument containing a transducer controlled to send out pulses at fixed time intervals, and one or more microphones arranged to permit measurements of the components of playing instrument motion, means of measuring the frequency of received pulses from said playing instrument transducer by said microphone and by other microphone installations, to provide means for determining the Doppler Effect, and thus determining the velocity of said playing instrument, means to combine the velocity and mid-air location to improve the information used by the system logic for track switching and scoring.

7. Apparatus as set forth in claim 5 providing a portable playing instrument, wherein said player input terminal includes a portable playing instrument containing a power source, a controlled time base, a pulse generator synchronized by the time base, and an ultrasonic transducer.

8. Apparatus as set forth in claim 7 providing means for a game during which the player constantly attempts to evade mid-air projected foreshortened perspective animation action, wherein said player input terminal includes two portable transducer units, one as a playing instrument component, and the other attached to the player, wherein said means for producing digital signals representative of the coordinates produces signals of the location of each of two portable transducer units with respect to a configuration of microphones.

9. Apparatus as set forth in claim 7 incorporating alternate means of viedo-audio recording and display, comprising:

means to utilize motion picture recording for large screen projection, and means to utilize video recording of pictures as images and/or digital representations.

*10. An interactive video game system comprising:*

*moveable user input means disposed in front of a display, means said moveable user input means manipulable by a user and including transmitter means for generating and transmitting position signals representative of the location of said moveable user input means with respect to said display means;*

*storage means for storing and playing back data representing a plurality of randomly selectable action sequences of visual images, said storage means including storage media for storing said data in multiple tracks, each said action sequence comprising at least one coded frame representative of said visual images, each said coded frame including coded location coordinates associated with said visual images, said storage means responsive to selection signals for switching between said multiple tracks for selection and play back of action sequences for display;*

*said display means coupled to said storage means for displaying selected ones of said plurality of action sequences;*

*memory means for storing a table of values, said values representing digital coordinates corresponding to said coded location coordinates of said coded frames in a selected action sequence, said table of values entered in said memory means at the commencement of display of a selected action sequence;*

*control means coupled to said storage means, said display means and said memory means, including receiving means for receiving said transmitted position signals, said control means for determining the position of said moveable user input means and comparing said position to said digital coordinates associated with a selected visual image of a currently displayed action sequence for determining the position of said moveable user input means with respect to the position of at least one currently displayed selected visual image, said control means responsive to said moveable user input means respective position for selecting a next successive one of said plurality of action sequences for display.*

*11. An interactive video game system as in claim 10 wherein said transmitter means comprises a transducer and a signal generator, said signal generator generating said position signal, said position signal being radiated by said transducer.*

*12. An interactive video game system as in claim 11 wherein said transducer comprises an ultrasonic transducer and said signal generator comprises a pulse generator for generating an ultrasonic pulse signal, said ultrasonic transducer radiating a repetitive ultrasonic pulse signal.*

*13. An interactive video game system as in claim 12 wherein said receiving means comprises at least two transducers, said transducers disposed on said display means in spaced-apart relationship adjacent said displayed action sequences, each of said transducers receiving said transmitted position signal and providing location signals indicative of said moveable user input means position with respect to said transducers.*

*14. An interactive video game system as in claim 13 wherein said moveable user input means comprises a player instrument allowing a user to contact a display screen of said display means indicating a user response to a currently displayed action sequence, said player instrument coupled to said control means.*

*15. An interactive video game system as in claim 14 wherein said player instrument includes switch means disposed at a contact tip thereof, said switch means providing a signal indicating when said contact tip is in touch contact with said display screen.*

*16. An interactive video game system as in claim 12 wherein said receiving means comprises a plurality of transducers disposed in spaced apart-position, each of said transducers receiving said transmitted position signal and providing location signal indicative of said moveable user input means position with respect to said transducers.*

*17. An interactive video game system as in claim 16 wherein at least one of said plurality of transducers is mounted on said display means adjacent said displayed action sequences.*

*18. An interactive video game system as in claim 16 wherein said moveable user input means comprises a player instrument adapted for user movement responsive to said currently displayed action sequence.*

*19. An interactive video game system as in claim 18 wherein said player instrument comprises a baseball bat, said baseball bat including a transducer disposed at a predetermined impact point, said baseball bat further including a pulse generator coupled to said transducer, said transducer radiating a repetitive pulse signal, said receiving transducers receiving said repetitive pulse signal and providing location signals indicative of the position of said impact point with respect to said receiving transducers.*

*20. An interactive video game system as in claim 19 wherein said baseball bat is coupled to said control means, said baseball bat adapted for swinging motion provided by a user responsive to said currently displayed action sequence, said selected visual image comprising a pitched baseball, said controller means selecting a next successive one of said action sequences for display by said display*

*means in response to said impact point position with respect to said pitched baseball image at a predetermined point in space during the swing of said baseball bat.*

*21. An interactive video game system as in claim 10 wherein said control means includes selection means responsive to a user input for selecting a desired action sequence to be displayed following the conclusion of a current play episode, said play episode comprising at least one of said plurality of action sequences.*

*22. An interactive video game system as in claim 10 wherein said control means includes random selection means for randomly selecting a next action sequence to be displayed following the conclusion of a current play episode. said play episode comprising at least one of said plurality of action sequences.*

*23. An interactive video game system as in claim 10 wherein said randomly selectable action sequences of visual images comprise prerecorded animated motion picture segments, each said segment comprising coded frames of visual images for track switching, said segments stored in multiple tracks of said storage media.*

*24. An interactive video game system as in claim 23 wherein said motion picture segments are arranged in related groups forming game episodes, each of said groups comprising at least one of said motion picture elements, said game episodes stored on multiple tracks on video tape media.*

*25. An interactive video game system as in claim 24 wherein said storage means includes tape reading means coupled to said control means for reading said video tape media for display and rewinding said video tape, said tape reading means responsive to control signals generated by said control means for rewinds of said videotape to play selected motion picture segments or game episodes.*

*26. An interactive video game system as in claim 25 wherein said control means generates said control signals providing for random selection of a game episode to be displayed at the conclusion of a currently displayed game episode in accordance with a random number device.*

*27. An interactive video game system as in claim 25 wherein said control means generates said control signals for selection of a desired game episode in response to a user input.*

*28. An interactive video game system as in claim 23 wherein said storage media comprises a video disc.*

*29. An interactive video game system as in claim 10 wherein said randomly selectable action sequences of visual images includes camera-originated animated motion picture segments and computer generated graphics.*

*30. An interactive video game system as in claim 29 wherein said randomly selectable action sequences of visual images are stored in digital form in a read-only-memory means.*

*31. An interactive video game system as in claim 30 wherein said read-only-memory means comprises a plug-in game cartridge.*

*32. A method of simulating an active game in which a player participates comprising the steps of:*

*storing data in coded frames on multiple tracks defined in storage media, said data representing a plurality of randomly selectable action sequences of visual images;*

*assigning coded location coordinates of selected visual images associated with each said coded frame;*

*storing a table of values, said values representing digital coordinates corresponding to said coded location coordinates of said selected visual images;*

*displaying selected ones of said plurality of action sequences on a display means, said display means for displaying selected ones of said plurality of action sequences, said table of values entered in a memory means at the commencement of display of a selected action sequence;*

*providing a moveable input means disposed in front of said display means, said moveable input means adapted for user manipulation for generating position signals representative of the location of said moveable input means in response to a currently displayed action sequence;*

*generating and transmitting position signals representing the position of said moveable input means;*

*receiving said transmitted position signals;*

*comparing the position of said moveable input means with said digital coordinates associated with at least one of said visual images to determine the position of said moveable input means with respect to the position of a currently displayed selected visual image;*

*selecting a next successive one of said action sequences for display by said display means in response to the location of said moveable input means with respect to said currently displayed selected image; and*

*switching between said multiple tracks for selection and display of said next successive action sequence.*

*33. The method of claim 32 including the additional steps of:*

*forming game episodes comprising at least one of said plurality of action sequences; and*

*randomly selecting a next successive game sequence to be displayed at the conclusion of a currently displayed game sequence in accordance with a random number generator.*

* * * * *